March 1, 1966 D. L. HAMPL 3,237,798
HYDRAULIC LOAD CARRIER
Filed Oct. 4, 1962 3 Sheets-Sheet 1
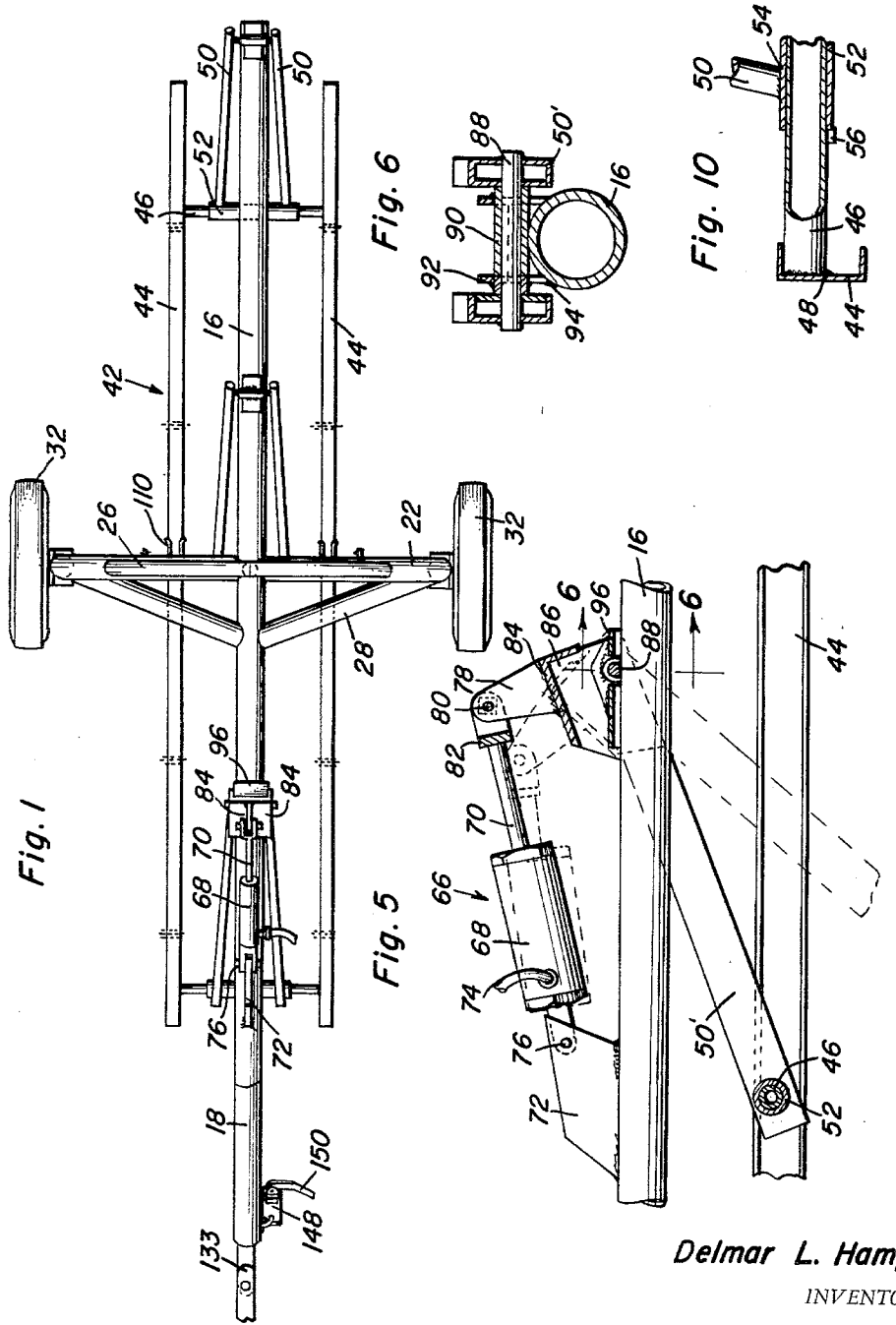
Delmar L. Hampl
INVENTOR.

March 1, 1966
D. L. HAMPL
3,237,798
HYDRAULIC LOAD CARRIER
Filed Oct. 4, 1962
3 Sheets-Sheet 2
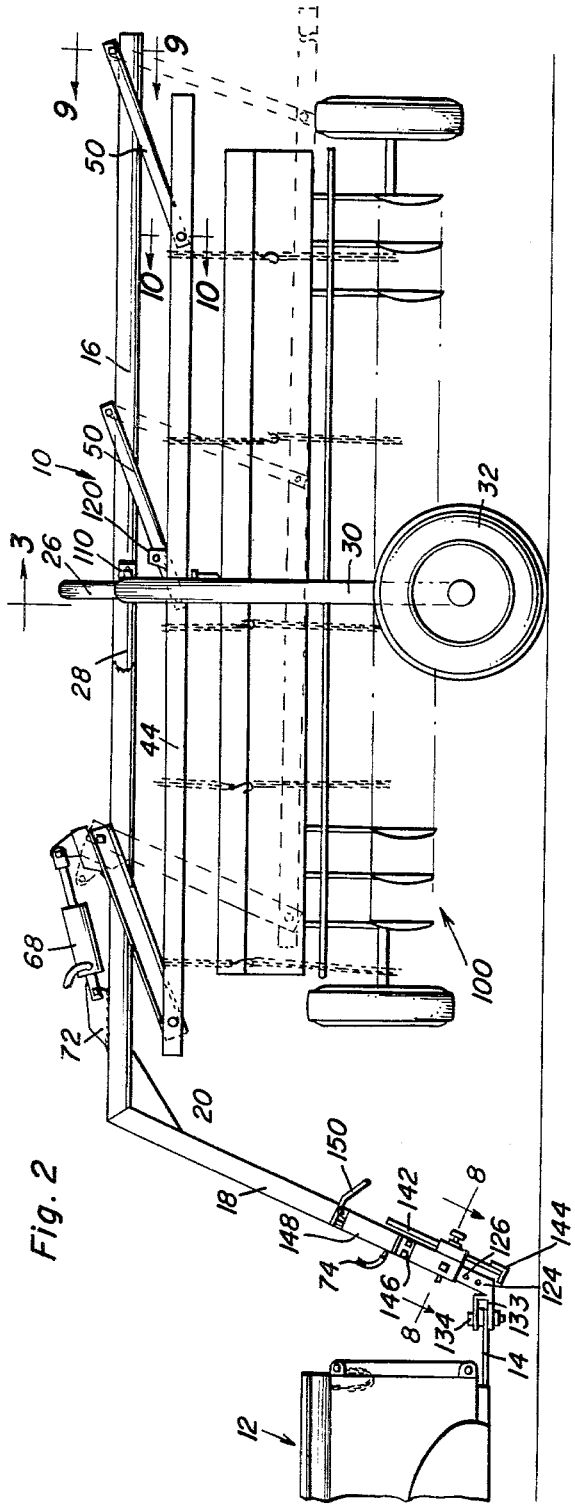
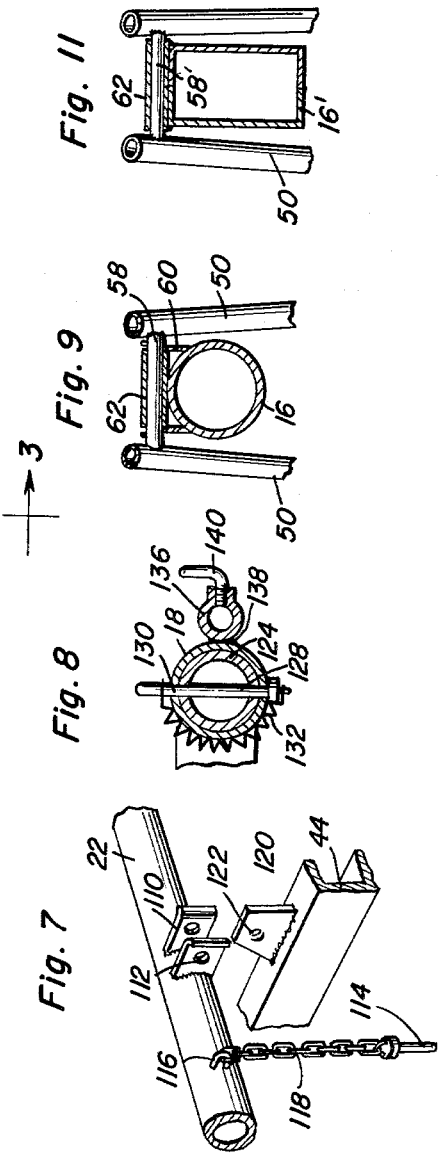
Delmar L. Hampl
INVENTOR.

March 1, 1966 D. L. HAMPL 3,237,798
HYDRAULIC LOAD CARRIER
Filed Oct. 4, 1962 3 Sheets-Sheet 3
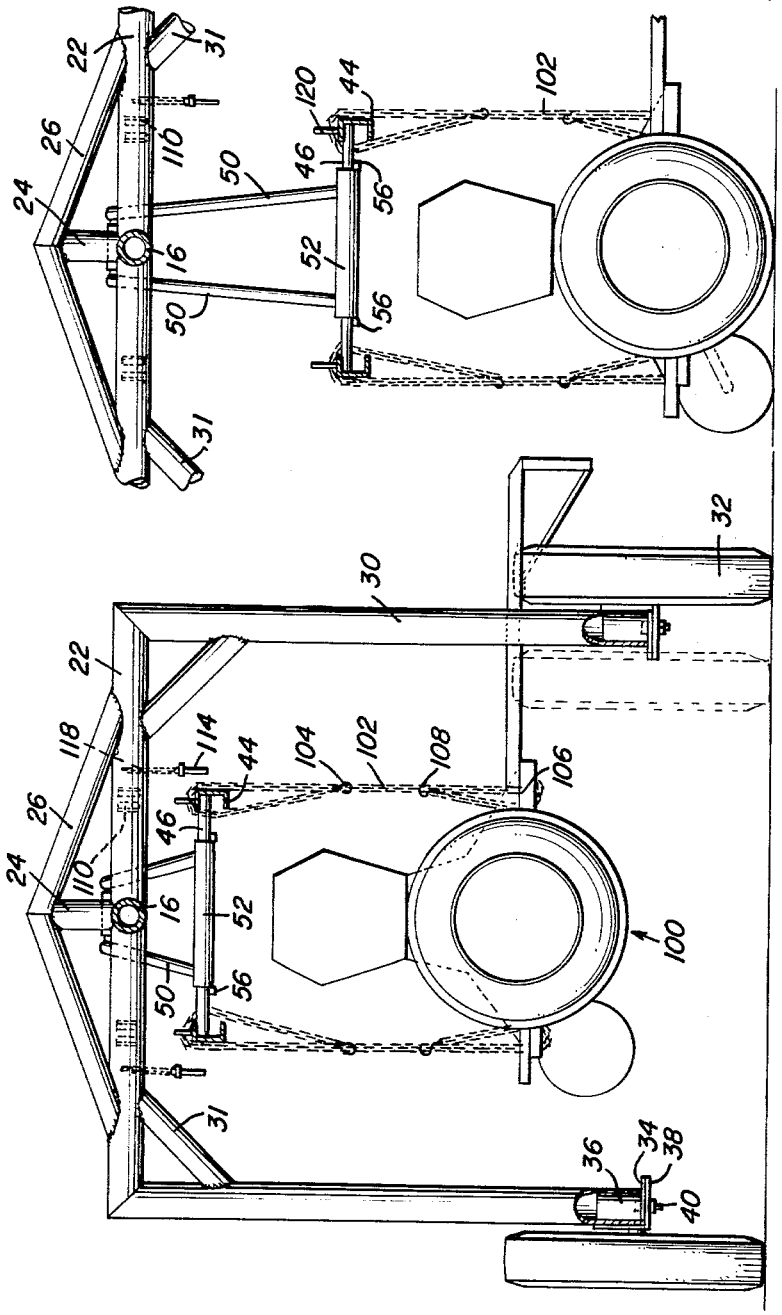
Delmar L. Hampl
INVENTOR.

United States Patent Office 3,237,798
Patented Mar. 1, 1966

3,237,798
HYDRAULIC LOAD CARRIER
Delmar L. Hampl, 916 E. 1st, Russell, Kans.
Filed Oct. 4, 1962, Ser. No. 228,350
6 Claims. (Cl. 214—394)

The present invention generally relates to a load carrier which is hydraulically operated for elevating the load so that it can be carried and more particularly relates to a trailer type of device especially adapted to but not necessarily limited to the use of carrying farm implements or the like.

The primary object of the present invention is to provide a straddle type of carrier in which an implement to be carried is straddled by the carrier and connected thereto and then elevated to a carrying position by a hydraulically operated mechanism.

Another object of the present invention is to provide a load carrier preferably but not limited to a two wheel trailer construction including a lift frame to which the article being carried is attached and including a plurality of generally parallel depending arms connected to the lift frame so that by virtue of the parallelogram linkage formed by the lift frame and the depending arms and the main frame of the trailer, the article being carried may be elevated to a carrying position together with there being provided a safety lock mechanism for retaining the lift frame in elevated position.

A further important object of the present invention is to provide a load carrier which is hydraulically actuated and which is of the straddle type for connection with any suitable tractor vehicle having a source of hydraulic power or a manually operated hydraulic pump may be provided on the device for elevating the article to be carried thus enabling the device to be used with tractors or other towing implements such as a pickup truck or the like which normally does not have a hydraulic pump incorporated therewith.

Still another important object of the present invention is to provide a load carrier which is hydraulically operated and which is simple in construction, easy to maneuver, well adapted for carrying various types of articles, includes safety features for locking the lift frame in elevated position and which is still relatively inexpensive to manufacture, dependable and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the load carrier of the present invention;

FIGURE 2 is a side elevational view of the load carrier with a farm implement supported in elevated position illustrating the orientation of the components when in their elevated position and illustrating by dotted line the position of the components in their lowered position;

FIGURE 3 is a transverse, sectional view taken substantially upon plane passing along section line 3—3 of FIGURE 2 illustrating further structural details of the structure of the invention;

FIGURE 4 is a fragmental view similar to FIGURE 3 but with the article and the components disposed in a lowered position;

FIGURE 5 is a detailed sectional view of the hydraulic mechanism for raising and lowering the article to be carried;

FIGURE 6 is a detailed sectional view taken substantially upon a plane passing along section line 6—6 of FIGURE 5 illustrating the manner in which the hydraulic mechanism is connected with the support frame and the offset arms for swinging the lift frame;

FIGURE 7 is a fragmentary perspective view illustrating the safety lock mechanism for retaining the lift frame in elevated position independent of the lifting mechanism;

FIGURE 8 is a detailed sectional view taken substantially upon a plane passing along section line 8—8 of FIGURE 2 illustrating the adjustable construction of the hitch mechanism and also the adjustable prop for supporting the front end of the trailer when not connected to a towing vehicle;

FIGURE 9 is a detailed sectional view taken substantially upon a plane passing along section line 9—9 of FIGURE 2 illustrating the manner in which the lift arms are connected to the main frame of the load carrier;

FIGURE 10 is a detailed sectional view taken substantially upon a plane passing along section line 10—10 of FIGURE 2 illustrating the manner in which the lower ends of the lift arms are attached to the lift frame; and FIGURE 11 is a detailed sectional view illustrating a modified type of frame structure.

Referring now specifically to the drawings, the numeral 10 generally designates the load carrier of the present invention which is in the form of a two wheel trailer for attachment to a towing vehicle generally designated by the numeral 12 and illustrated as in the form of a pickup truck or the like having a drawbar 14 projecting from the rear thereof. It is understood that any type of towing vehicle may be employed such as a tractor, truck or the like which is equipped with a drawbar or an equivalent mechanism to which the load carrier may be attached.

The load carrier includes an elongated centrally disposed tubular main frame member 16 in the form of a hollow cylindrical pipe. At the forward end of the main frame member 16, there is provided a downwardly and forwardly inclined frame member 18 of similar construction which is rigidly attached to the end of the longitudinal main frame member 16 by any suitable means such as welding or the like. A gusset plate 20 is disposed in the included angle between the longitudinal main frame 16 and the forwardly and downwardly inclined frame member 18.

Attached to the longitudinal main frame 16 at generally a central location is a transverse main frame 22 also of pipe construction. For reinforcement of the transverse as well as the longitudinal main frame, there is provided a short upstanding pipe member 24 on the longitudinal main frame 16 which is connected to a pair of inclined brace members 26 as illustrated in FIGURE 3. This will reinforce the transverse frame member 22 as well as the longitudinal frame member 16. Also interconnecting the main frame 16 and the transverse frame member 22 is a pair of inclined braces 28 which extend from the outer ends of the transverse frame member 22 forwardly and connect rigidly with the longitudinal frame as illustrated in FIGURE 1 and also in FIGURE 2.

Depending from the ends of the transverse main frame member 22 is a pair of vertical wheel supports or frame members 30 which are also of tubular construction and tubular braces 31 extend across the corner formed by the upper ends of the wheel supports and the transverse main frame member 22. This construction forms substantially an inverted U-shaped construction with the wheel supports 30 forming the legs of the U and the transverse frame member 22 forming the bight portion thereof. At the lower end of the wheel supports 30 is a wheel assembly 32 including a plate 34 rigidly affixed to the tubular frame member 30 by virtue of a plug 36 extending upwardly thereinto. The wheel assembly 32 includes a mounting plate 38 which is adjustably secured thereto about a vertical axis by fastening bolts 40 thus enabling the wheel assembly 32 to be disposed on the exterior of the wheel support 30 as illustrated in FIGURE 3 or on the interior thereof as illustrated in dotted line in FIGURE 3 thus enabling the distance between the wheel assemblies 32 to be varied. Any suitable type of wheel assembly may be employed such as a conventional wheel rim and pneumatic tire mounted thereon.

A lift frame generally designated by the numeral 42 is suspended from the longitudinal main frame 16 and the lift frame 42 includes a pair of longitudinally extending parallel rails 44 in the form of inwardly facing channel shaped members which are rigidly interconnected by tubular pipes 46 as illustrated in FIGURE 10 with the ends thereof rigidly affixed to the rails 44 as by welding 48 or the like. The lift frame 42 is suspended from the longitudinal main frame 16 by a plurality of pairs of lift arms 50 which diverge downwardly and have the lower ends thereof rigidly secured to a tubular sleeve 52 as by welding 54. The sleeve 52 is journaled on the transverse pipe 46 and is retained in centralized position thereon by stop members 56 fixed to the pipe 46 as by welding or the like whereby the sleeve 52 will be retained in centralized position on the pipe 46 and in spaced relation to the rails 44.

As illustrated in FIGURE 9, the upper ends of the arms 50 are rigidly connected by a rod 58 or the like which is secured to the arms 50 as by welding. The longitudinal main frame 16 is provided with a pair of upstanding brackets 60 rigidly affixed thereto which brackets are attached to a sleeve 62 journaling the rod 58 therein. Thus, the lift arms 50 are pivotally attached to the top surface of the longitudinal main frame 16 and pivotally attached to the transverse pipe 46 extending between the rails 44 of the lift frame 42. This assembly provides a rigidity in the structure and prevents the lift frame from deflecting laterally.

As illustrated, three lift arm assemblies are illustrated with the two rearmost lift arm assemblies being identical while the forwardmost lift arm assembly is somewhat different except for the manner of attachment to the transverse pipe which is the same in the forward lift arm assembly as in the rearmost lift arm assemblies. Further, any number of lift arm assemblies may be provided depending upon the load to be carried and the over-all length of the carrier.

The lift mechanism includes a hydraulic piston and cylinder assembly generally designated by reference numeral 66 which includes a cylinder 68 having a piston therein and a piston rod 70 connected thereto and projecting therefrom. The cylinder 68 is pivotally connected to an upstanding gusset plate 72 rigidly affixed to the top surface of the longitudinal main frame member 16 forwardly of the forward lift arm assembly. A hydraulic pressure line 74 is connected to the forward end of the cylinder 68 and the cylinder may be of the single acting type since the load of the lifting frame or the article supported thereby will normally cause the lifting frame to gravitate downwardly when the hydraulic pressure is released from the forward end of the cylinder 68. A pivot pin or bolt 76 is provided for connecting the forward end of the cylinder 68 to the bracket 72. The rear end of the piston rod 70 is connected to an upstanding arm 78 by virtue of a pivot bolt 80 which extends through the arm 78 and a U-shaped clevis 82 on the rear end of the piston rod 70. The arm 78 is attached to a generally L-shaped plate member 84 that fits over and receives and is rigidly affixed to enlarged ends 86 of the lift arms 50' which in this instance are rectangular tubular members as illustrated in FIGURE 6. Since the lift arms in this forward assembly are different from the lift arms 50 which are in the form of tubular pipes, reference numeral 50' designates the forward set of lift arms. Thus, the plate 84, arm 78 and the lift arms 50' are of rigid construction and all pivot as a unit about a pivot shaft 88 extending through the lift arms 50' and through a sleeve 90 carried by mounting plates 92 that are parallel to each other and rigidly affixed to the main frame 16 as by welding 94 or the like. The sleeve 90 corresponds with the sleeve 62 but is of more rigid construction and an inverted channel-shaped plate 96 is provided on the main frame 16 for purposes of limiting the pivotal movement of the lift arms 50' by virtue of the L-shaped plate 84 engaging the plate 96 during swinging movement thereof about the axis defined by the pivot shaft 88 or the engagement of plate 84 with the main frame 16 may limit the pivotal movement of arms 50'.

While the invention is substantially unlimited as to the articles that can be carried, an elongated farm implement such as a drill is illustrated as being supported from the carrier and is designated generally by the numeral 100. Supporting chains 102 are provided which merely encircle the lift rails 44 and are provided with hooks 104 for retaining the upper ends thereof connected with the lift rails. The lower ends of the chain 102 encircle convenient portions of the frame 106 of the drill 100 or other implement and also have hooks 108 engageable in the chain links for supporting the implement at a plurality of longitudinally spaced points thereby securely affixing and suspending the implement in suspended relation to the lift frame.

The transverse frame member 22 is provided with a plurality of pairs of rearwardly extending lugs 110 each of which is provided with an aperture 112 as illustrated in FIGURE 7 for receiving a lockpin 114 which is tethered to a loop 116 fixed to the transverse frame member 22 by virtue of a flexible chain 118 or the like. Each lift rail 44 is provided with a projecting lug 120 having an aperture 122 therein which will be aligned with the apertures 112 in the lugs 110 when the lift frame and the article supported thereby is elevated. Thus, when the lift frame and the article is elevated so that the lug 120 is received between the lugs 110, the pin 114 may be inserted in the aligned apertures 112 and 122 thus forming a safety lock for retaining the lift frame in elevated position without requiring the hydraulic piston and cylinder arrangement 66 to be maintained under a pressure to retain the load in elevated position. This not only forms a safety lock but also reduces the wear on the piston and cylinder assembly since the hydraulic presure may be released therefrom. When it is desired to again lower the lift frame, it is only necessary to use the hydraulic piston and cylinder arrangement to take the load off of the pin 114 so that it may be retracted. The pin 114 may be provided with a lock mechanism on the free end thereof which will prevent the pin from being retracted accidentally or prevent the pin from falling out due to vibration or the like.

The orientation of the lift frame and the longitudinal main frame together with the lift arms 50 and 50' form a pivotal parallelogram type of device which moves in a vertical plane during swinging movements of the lift arms. Any number of lift arms may be employed and this will be determined by the over-all length of the device and the loads intended to be carried thereby.

The lower end of the downwardly inclined frame member 18 is provided with a telescopic lower section 124 having a plurality of longitudinally spaced apertures 126 therein for adjusting the effective length of the downwardly inclined frame member 18 by inserting a pin 128 through one of the apertures 126 and corresponding apertures 130 in the lower end of the inclined frame member 18. The pin 128 is retained in place by a coil spring 132 having one end thereof anchored to the headed end of the pin 128 and the other end thereof received in a groove, notch or the like in the free end of the pin 128. The lower end of the extension 124 is provided with a forwardly projecting clevis hitch 133 for reception on the drawbar 18 and for receiving a hitch pin 134 thus pivotally and detachably securing the hitch clevis 133 to the drawbar 14.

On the rear surface of the lower end portion of the frame member 18, there is provided a tubular sleeve 136 secured to the member 18 by welding 138 or the like and a setscrew or lock screw 140 is threaded into the side of the sleeve 136 remote from the tubular frame member 18. An elongated prop 142 is adjustably and slidably disposed in the sleeve 136 and the lower end of the prop 142 is provided with a foot 144 for engaging the ground surface thereby supporting the forward end of the load carrier when it is detached from the towing vehicle so that the hitch clevis 133 will normally be supported in an elevated position so that it may be more readily engaged with the drawbar. The setscrew 140 is provided with a T-shaped or L-shaped handle thereby eliminating the need of a wrench and enabling manipulation with one hand while holding up the front end of the trailer. If desired, a pin and a series of apertures similar to 126 and 128 may be used to lock the prop 142 in longitudinally adjusted position.

The lower end portion of the tubular frame member 18 is also provided with a laterally extending supporting plate 146 on which is supported a hydraulic pump 148 having a manually operated handle 150 projecting therefrom whereby the handle 150 may be operated in a conventional manner for operating the hydraulic pump 148 for supplying hdraulic fluid under pressure to the piston 68 through the conduit 74 which is also connected with the pump 148. Thus, the trailer or implement carrier may be easily manipulated by hand since it is substantially balanced at the center point thereof on the wheels 32. Even when attached to the vehicle, it may be easily brought into straddling relation to the implement 100 to be carried after which the load frame 42 may be lowered and the lift chains 102 engaged with the implement in an obvious manner. As the load is lifted, the center of gravity shifts forwardly thus placing a load on the hitch. The pump 148 may then be manipulated for expanding the piston rod 70 thus elevating the lift frame 42 and elevating the implement 100. The lock pin 114 may then be inserted in place and the device is then ready for over-the-road movement or for movement wherever desired.

FIGURE 11 illustrates a modified type of longitudinal main frame 16' which is in the form of a box frame member formed by welding two channel shaped members together thus forming a very rigid main frame. In this form of the invention, the sleeve 62' is rigidly affixed directly to the main frame member 16' and receives the shaft 58' which interconnects the lift arms identical to lift arms 50. As previously indicated, the effective height of the hitch may be varied for enabling the device to be used with various types of towing vehicles including tractors, automobiles, pickup trucks or the like. The device may be used either with the hydraulic system of such a towing vehicle or the hydraulic system may be the manually operated pump as illustrated. The pump has the usual hydraulic fluid reservoir and the necessary manually operated control valves for controlling operation of the hydraulic fluid in a conventional manner. The device has been successfully operated for carrying relatively long implements such as a rather unwieldy grain drill, large harrow, rotary hoe or the like. As illustrated, a sixteen furrow drill has been successfully carried behind a passenger-type automobile which is facilitated by virtue of the point of the wheels in relation to the frame. The particular mounting of the forward lift arms and the manner in which the piston rod is associated therewith assures that the lowermost position of the lift frame is such that there still will be an angle of application of force to the upstanding arm attached to the piston rod. The L-shaped plate limits the downward movement of the lift frame and the upper limit is reached when carrier rails 44 strikes the underside of transverse frame member 22 or when sleeve 52 on the master arm strikes underside of main frame 16. The particular shape, size and orientation of the framing may vary as desired and reinforcing gussets and the like may be employed where required. The particular orientation of the pipe which extends between the lift rails enables the lift frame to be rigidified by a full weld completely around the pipe 46. Additionally, it is pointed out that any number of lift arm assemblies may be employed and the lift mechanism may be associated with any of the lift arm assemblies. Also, the same inventive principles may be employed in conjunction with a four wheel trailer which may be made sufficiently long to carry two drills as illustrated in the drawing. Also, the load could be attached by ropes or cables with grab hooks. For industrial use, direct connection to the load can be made by specially designed pallets, bins, slings and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A load carrier for elongated implements and the like comprising an elongated longitudinal main frame member, a transverse frame member rigidly connected to the longitudinal frame member intermediate the ends thereof, depending wheel assemblies mounted at each end of the transverse frame member thereby supporting the longitudinal frame member in elevated position so that the longitudinal frame member may be orientated in overlying relation to an implement to be supported with the wheel assemblies intermediate the ends of such an implement, downwardly extending means at the forward end of the longitudinal frame member for connection with a towing vehicle, and a lift frame carried below the longitudinal frame member for movement from a lowered position to an elevated position whereby the lift frame may be connected with the implement to be lifted for elevating such an implement, said lift frame including a pair of parallel laterally spaced rails interconnected by a plurality of longitudinally spaced members, a plurality of lift arm assemblies interconnecting the lift frame and the longitudinal frame member, and hydraulic means interconnecting the longitudinal frame member and one of the lift arm assemblies for swinging the lift arm assemblies and the lift frame for moving it in a vertical direction.

2. A load carrier for elongated implements and the like comprising an elongated longitudinal main frame member, a transverse frame member rigidly connected to the longitudinal frame member intermediate the ends thereof, depending wheel assemblies mounted at each end of the transverse frame member thereby supporting the longitudinal frame member in elevated position so that the longitudinal frame member may be orientated in overlying relation to an implement to be supported with the wheel assemblies intermediate the ends of such an implement, downwardly extending means at the forward end of the longitudinal frame member for connection with a towing vehicle, and a lift frame carried below the longitudinal frame member for movement from a lowered position to an elevated position whereby the lift frame may be connected with the implement to be lifted for elevating such an implement, said means at the forward end of the longitudinal frame member including a vertically adjustable hitch means for engagement with vehicular attached hitch mechanisms of varying elevational positions, a vertically adjustable prop mounted on the lower end of the means at the forward end of the longitudinal frame member for supporting the same from the ground surface.

3. A load carrier for elongated implements and the like comprising an elongated longitudinal main frame member, a transverse frame member rigidly connected to the longitudinal frame member intermediate the ends thereof, depending wheel assemblies mounted at each end of the transverse frame member thereby supporting the longitudinal frame member in elevated position so that the longitudinal frame member may be orientated in overlying relation to an implement to be supported with the wheel assemblies intermediate the ends of such an implement, downwardly extending means at the forward end of the longitudinal frame member for connection with a towing vehicle, and a lift frame carried below the longitudinal frame member for movement from a lowered position to an elevated position whereby the lift frame may be connected with the implement to be lifted for elevating such an implement, said means at the forward end of the longitudinal frame member including a vertically adjustable hitch means for engagement with vehicular attached hitch mechanisms of varying elevational positions, a vertically adjustable prop mounted on the lower end of the means at the forward end of the means at the forward end of the longitudinal frame member for supporting the same from the ground surface, said transverse frame member and the lift frame including cooperating safety lock means for mechanically retaining the lift frame in elevated position.

4. The structure as defined in claim 3 wherein a plurality of chains is provided in encircling relation to each of the lift rails for engagement with the implement to be supported by the carrier.

5. A carrier for elongated load comprising an elongated main frame adapted to overlie and straddle the load, wheel assemblies on said main frame for receiving the load therebetween, means at the forward end of the main frame for connection with a motivating device, a subframe disposed below the main frame and adapted to overlie the elongated load, a plurality of longitudinally spaced lift arms pivotally interconnecting the main frame and subframe for pivotal movement about transverse axes whereby the subframe may be swung in an arcuate manner to change the elevational and longitudinal position thereof in relation to the main frame, power means interconnecting the main frame and at least one of said lift arms for pivoting said lift arm and swinging the subframe thereby causing all of the lift arms to move in parallelism for raising and lowering the subframe, cooperating lock means mounted partially on the main frame and partially on the subframe for locking engagement when the subframe is elevated to its upper position thereby locking the subframe in elevated position for carrying the load.

6. The structure as defined in claim 5 wherein said main frame includes a longitudinal frame member, each lift arm including a pair of downwardly extending laterally spaced arm members, hinge means connecting the arm members to the top surface of the longitudinal frame member with the arm members extending downwardly on each side of the longitudinal frame member to a point below the main frame and being pivotally attached to said subframe.

References Cited by the Examiner
UNITED STATES PATENTS

| | | | |
|---|---|---|---|
| 2,649,218 | 8/1953 | Timlin | 214—394 |
| 2,772,010 | 11/1956 | Buehring | 214—394 |
| 2,875,911 | 3/1959 | Jennings | 214—394 |

GERALD M. FORLENZA, *Primary Examiner.*

MORRIS TEMIN, HUGO O. SCHULZ, *Examiners.*